United States Patent [19]

Wolinski et al.

[11] 4,080,238

[45] Mar. 21, 1978

[54] ONE-LIQUID COLD SETTING ADHESIVE WITH ENCAPSULATED CATALYST INITIATOR

[75] Inventors: Leon E. Wolinski, Cheektowaga; Peter David Berezuk, Buffalo, both of N.Y.

[73] Assignee: Pratt & Lambert, Inc., Buffalo, N.Y.

[21] Appl. No.: 705,333

[22] Filed: Jul. 14, 1976

[51] Int. Cl.$^2$ .................................................. C09J 5/00
[52] U.S. Cl. .................................. 156/305; 156/331; 260/8; 260/859 R; 260/859 PV; 428/307; 428/425
[58] Field of Search ................ 260/8, 859 R, 859 PV; 252/316; 156/331, 305, 218, 295; 428/425, 500, 307

[56] References Cited

U.S. PATENT DOCUMENTS

| | | | |
|---|---|---|---|
| 3,632,296 | 1/1972 | Pandell | 252/316 |
| 3,666,597 | 5/1972 | Parnell | 156/331 |
| 3,748,313 | 7/1973 | Bulbenko | 260/79 |
| 3,963,680 | 6/1976 | O'Keefe | 260/859 R |
| 3,994,764 | 11/1976 | Wolinski | 428/425 |

OTHER PUBLICATIONS

"Microencapsulation", Kirk–Othmer Encyclopedia of Chem. Tech., Second Ed., 1967, pp. 436–455, Wiley & Sons, N. Y., N. Y.

Chem. Absts. vol. 74 (1971) 142845f, "Storage Stable-- Compositions", Bulbenko et al.

*Primary Examiner*—Edward M. Woodberry
*Attorney, Agent, or Firm*—Christel & Bean

[57] ABSTRACT

A one-liquid cold setting adhesive comprising a thermoplastic, non-reactive polyurethane polymer dissolved in an addition-polymerizable combination of an acrylic or methacrylic monomer other than the acids, a copolymerizable monomer containing at least one free carboxylic group, a non-activated free radical addition polymerization catalyst system and an activator for the free radical catalyst system encapsulated in pressure-rupturable microspheres or beads having a composition which is substantially insoluble in the presence of the other components of the mixture for a relatively long time period. Exemplary of this adhesive formulation is a polyester polyurethane containing no free isocyanate groups dissolved in a mixture of methacrylic acid and methyl methacrylate, each of the three components being present in equal amounts. Included in the mix is benzoyl peroxide and hydroquinone. To this mix are added formaldehyde crosslinked gelatin microspheres having encapsulated therein an amine activator for the benzoyl peroxide. The resulant mixture has a long storage life; but when the microspheres are ruptured, the peroxide becomes activated and the adhesive bond-forming reaction takes place.

36 Claims, No Drawings

ONE-LIQUID COLD SETTING ADHESIVE WITH ENCAPSULATED CATALYST INITIATOR

CROSS REFERENCE TO RELATED APPLICATIONS

This application is related to application, Ser. No. 586,655 to Wolinski, filed June 13, 1975 now U.S. Pat. No. 3,994,764, and assigned to Pratt and Lambert, Inc., the assignee of the present application. Said U.S. Pat. No. 3,994,764, is hereby incorporated by reference herein.

BACKGROUND OF THE INVENTION

This invention relates to one-liquid adhesive compositions comprising a non-reactive thermoplastic polyurethane resin, an acrylic monomer, a polymerizable acid monomer, a free radical polymerization catalyst having dispersed therein pressure-rupturable microspheres encapsulating an activator for said catalyst.

In copending application, Ser. No. 586,655 now U.S. Pat. No. 3,994,764, previously referred to, a two-liquid adhesive composition is disclosed comprising one solution of a polyurethane polymer plus polymer precursors, as in the present application, and a solution of polymerization catalyst activators. In joining a pair of mating surfaces, one surface may be coated with the polymer and prepolymer solution and the other with the activator solution and thereafter placing the surfaces in contact until the adhesive cures. Alternatively, one surface may be coated with both solutions, if desired.

The present invention eliminates the necessity for two solutions by encapsulating the catalyst activator in pressure-rupturable, substantially insoluble microspheres and dispersing the spherucles or beads in the polymer and prepolymer solution. The resultant one-liquid adhesive dispersion has a long shelf and pot life and is convenient to apply. In use, when it is desired to join two surfaces, one merely coats one surface with the adhesive dispersion, places the other surface in contact with the first, applies pressure to rupture the microspheres, and allows the sufficient curing time.

It is an object of this invention to provide a one-liquid adhesive composition and a method for using the same, said composition being capable of bonding a wide diversity of materials, with high strength joints both with respect to shear strength and peel strength, which attains bond strength rapidly, which requires no solvent or other volative ingredient, which has a long shelf life and pot life, which is effective with minimal or no surface preparation and which requires no expensive or elaborate equipment for use.

It is a further object of this invention to provide an adhesive dispersion and a method for using the same, the adhesive being comprised of (a) a solution of a non-reactive thermoplastic polyurethane resin, an acrylic and/or methacrylic monomer other than the acids, a co-polymerizable acid monomer, and a polymerization catalyst; and (b) pressure-rupturable microspheres or beads essentially insoluble in (a) having encapsulated therein an activator for the polymerization catalyst.

Further objects will become apparent from the following description and claims.

DESCRIPTION OF INVENTION

As stated above, this invention comprises two component elements, (A) the polymer and prepolymer solution, and (B) the microsphere encapsulated activator. (A) comprises, broadly, a non-reactive thermoplastic polyurethane polymer, an acrylic and/or methacrylic monomer other than the acids, a polymerizable acid monomer and a polymerizable catalyst. (B) comprises microspheres encapsulating a catalyst activator.

THE POLYURETHANE

Any polyester-based or polyether-based polyurethane resin may be used in the adhesives of the present invention, so long as the resin is non-reactive and thermoplastic—as those terms are hereinafter defined. As employed in the present disclosure, the term "non-reactive", as applied to the polyurethane component of the adhesives, means that the polymer contains no free, unreacted isocyanate groups, with the consequence that the polyurethane does not react to any notable degree with any component of the adhesive composition. A polyurethane which does not meet these criteria can be used in the present invention, but only if it is treated or reacted to bring it into conformity with these requirements. For example, a polyurethane which contains free isocyanate groups can be reacted wth a monofunctional alcohol or the like to eliminate free isocyanate. The reactant should, of course, not introduce olefinic unsaturation. The term "thermoplastic" as employed herein applies to polyurethanes which are not gelled or cross-linked and which do not become cross-linked in the present adhesive formulations. Generally, such polyurethanes will be linear, or substantially so, although branching is not prohibited so long as the resultant polymer does not form an acrylic monomer insoluble gel. Extreme branching which results in an insoluble, substantially three-dimensional matrix polymer prevents the attainment of the objects of the present invention; and polyurethanes of such character are not contemplated within the scope of the present invention.

The formation of the poly (ester-urethanes) and poly (ether-urethanes) of the present invention are based on the reaction of an isocyanate group with active hydrogen atom containing hydroxyl groups. In order to form a high molecular weight polymer resin, the reactants will generally be difunctional, although minor proportions may have higher levels of functionality, creating some degree of branching, or minor proportions of monofunctional reactants will serve to terminate polymer chains, giving some degree of regulation and control of molecular weight. The formation of such polymers is per se well known to the art and does not as such form any part of the present invention. Indeed, many polyurethane resins which meet, or can be readily made to meet, the requirements of the present invention are available commercially, and such readily available and relatively inexpensive materials will often be desirable in the practice of the invention.

In the formation of poly (ether-urethanes), reactive organic polyfunctional polyols reacted with suitable isocyanates are the polyalkylene ether, thioether, and ether-thioether glycols represented by the genreal formula:

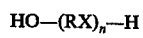

$$HO-(RX)_n-H$$

wherein R represents one or more alkylene radicals of up to about 10 carbon atoms, X represents oxygen or sulfur or a mixture of both, and $n$ in an integer. It is greatly preferred that $n$ be an integer large enough so that the molecular weight of the polyalkylene ether, thioether, or ether-thioether glycol is at least about 500, e.g., desirably from about 500 to about 10,000. The polyalkylene ether glycols included within this general formula, such as polyethylene glycols, polypropylene glycols, polybutylene glycols, polytetramethylene glycols, polyhexamethylene glycols, and the like are preferred. Such are obtained, for example, by acid-catalyzed polycondensation of the corresponding monomeric glycols, or by condensation of lower alkylene oxides, such as ethylene oxide, propylene oxide, and the like, either with themselves or with glycols such as ethylene glycol, propylene glycol, and the like.

Polyalkylenearylene ether, thioether and ether-thioether glycols, which have molecular weights ranging from about 500 to about 10,000 which correspond to the above general formula, differing from the above described polyalkylene glycols, in having arylene radicals, such as phenylene, naphthylene, and anthrylene radicals, either substituted or unsubstituted, in place of some — but not all — of the alkylene radicals can be employed. Thus, in the above formula, R will represent a mixture of alkylene and arylene radicals. In such circumstances, it has been found desirable that such materials have a molecular weight of at least about 500 for each such arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art, and forms no part of the present invention per se, it may be mentioned here by way of illustration the polyesters of this type may be prepared by the condensation of a polyhydric alcohol, generally a saturated aliphatic diol such as ehtylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g., chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000 acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula:

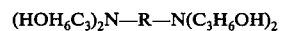

$(HOH_6C_3)_2N—R—N(C_3H_6OH)_2$ wherein R represents an alkylene radical having from 2 to 6 carbon atoms, inclusive, of which N,N,N',N'-tetrakis-(2-hydroxypropyl)-ethylenediamine is a representative species, as well as higher analogs thereof, such as hydroxypropylated polyalkylenepolyamines of the general formula:

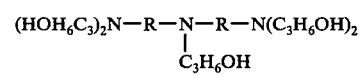

$$(HOH_6C_3)_2N—R—\underset{\underset{C_3H_6OH}{|}}{N}—R—N(C_3H_6OH)_2$$

wherein R is as defined hereinabove.

As can be readily appreciated, mixtures of the various reactive organic polyfunctional polyols described hereinabove may also be employed in preparing polyurethane resins useful in the practice of the present invention. Those of ordinary skill in the art will also readily recognize that care need be taken in the utilization of polyols containing more than two hydroxyl functionalities to be certain that insoluble gel polymers do not result as a consequence of excessive branching and cross-linking during polymerization. Similar considerations will apply to the selection of organic polyisocyanates hereinafter described.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4-t-butyl-m-phenylenediisocyanate, 4-methoxy-m-phenylenediisocyanate, 4-phenoxy-m-phenylenediisocyanate, 4-chloro-m-phenylenediisocyanate toluenediisocyanates (either as a mixture of isomers, e.g., the commercially avilable mixture of 80% 2,4-toluenediisocyanate and 20% 2,6-toluenediisocyanate, or as the individual isomers themselves), m-xylylenediisocyanate,
p-xylylenediisocyanate,
cumene-2,4-diisocyanate,
durenediisocyanate, 1,4-naphthylenediisocyanate,
1,5-naphthylenediisocyanate,
1,8-naphthylenediisocyanate,
2,6-naphthylenediisocyanate,
1-5-tetrahydronaphythylenediisocyanate,
p,p'-diphenyldiisocyanate,
diphenylmethane-4,4'-diisocyanate,
2,4-diphenylhexane-1,6-diisocyanate,
"bitolyenediisocyanate" (3,3'-dimethyl-4,4'-biphenylene-diisocyanate),
"dianisidinediisocyanate" (3,3'-dimethoxy-4,4'-biphenyl-enediisocyanate), and
polymethylenepolyisocyanates represented by the general formula:

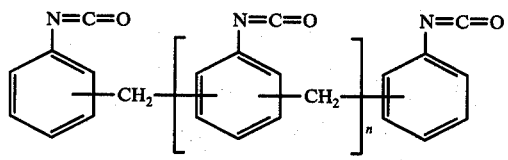

wherein n represents an integer between 0 and about 5, and the like; aliphatic diisocyanates, such as methylenediisocyanate, ethylenediisocyanate, the tri-, tetra-, penta-, hexa-, hepta-, octa-, nona- and decamethylene- diisocyanates, 2-chlorotrimethy-lenediisocyanate, 2,3-dimethyltetramethylenediisocyanate, and the like, and tri- and higher isocanates, such as benzene-1,3, 5-triisocyanate, toluene - 2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol sometimes being employed, reacting this mixture at a temperature ranging from about room temperature to about 100° C for from about 20 minutes to about 8 hours, and then cooling the resulting "prepolymer" to a temperature of from about room terperature to about 60° C.

Such techniques will ordinarily result in polymer molecules containing free isocyanate groups, which are eliminated conveniently by reaction with a monofunctional organic alcohol, phenol, thiol, amine, or other like monofunctional reactant, after completion of the polymerization reaction.

THE ACRYLIC MONOMER

Free radical addition polymerizable acrylic monomers are well known to those of ordinary skill in the art, and for purposes of the present invention conform to the general formula:

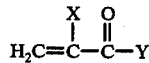

where X may be hydrogen, methyl, ethyl, or a halogen such as chlorine. Among these, it is preferred that X be hydrogen or methyl. Y in the above formula may in turn be represented by the general formulae:

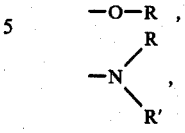

where R and R' each represent hydrogen, alkyl groups of up to 8, and occasionally more, carbon atoms and such alkyl groups substituted with hydroxyl, amino, halo, or aryl substituents.

Those of ordinary skill in the art will readily recognize that the foregoing formulae define acrylic and methacrylic esters, acrylic and methacrylic amides, and variously substituted variations thereof as preferred acrylic monomers. Acrylic acid and methacrylic acid, and other carboxylic acid functional monomers comprise a special case hereinafter discussed in detail and are not intended for inclusion in the group of acrylic monomers here defined. The esters will include, as preferred members of the group, methyacrylate, methylmethacrylate, ethylacrylate, ethylmethacrylate, propylacrylate, propylmethacrylate, n-butylacrylate, n-butylmethacrylate, iso-butylacrylate, iso-butylmethacrylate, and the like. In some circumstances, higher molecular weight esters, such as 2-ethylhexylacrylate and the like, and substituted, particularly hydroxy - or amino-substituted alkyl acrylates and methacrylates, exemplified by, for example, 2-hydroxyethylacrylate and N-methylaminoethyl methacrylate, are useful and desirable. The amides include acrylamide and methacrylamide, and the corresponding N substituted amides.

Still other acrylic monomers may be employed, including acrylonitrile, methacrylonitrile, and diacrylic or dimethacrylic esters and amides, or ester-amides, resulting from the reaction of the acids with a diol, diamine, or the like, such as ethylene glycol dimethacrylate, ethylenediamine dimethacrylamide, acid salts of quarternized ammonium alkyl acrylates and methacrylates, and the like.

Mixtures of two or more of such acrylic monomers is also contemplated in the practice of the present invention.

THE ACID MONOMER

Free radical addition polymerizable carboxylic acid group containing monomers copolymerizable with the aforesaid acrylic monomers constitute the second monomer component of the adhesive.

As will be readily recognized by those of ordinary skill in the art, acrylic acid and methacrylic acid, as well as esters and amides thereof substituted with carboxylic acid groups, meet the foregoing requirements.

Acrylic acid and methacrylic acid are the preferred acid monomers in the practice of the present invention. Other acid monomers of interest which will find use in the practice of the present invention include, for example, the half esters of 2-hydroxyethyl acrylate, or other reactive acrylic species, with dicarboxylic acids, such as maleic, itaconic, fumaric, oxalic, phthalic, and terephthalic acids, mixtures thereof, and the like.

THE CATALYST

Among the cure catalysts that are effective in the adhesives of the present invention are the free radical addition polymerization catalysts which are not active at room temperatures in the absence of an activator component. Such activator components are not included in the adhesive formulation, but rather are dealt with as hereinafter discussed. The catalysts of interest can be defined more precisely as those which have a half life at 85° C of at least one half hour. A preferred such catalyst is benzoyl peroxide, but those of ordinary skill in the art will recognize that other free radical catalysts may also be employed.

THE ADHESIVE FORMULATION

The foregoing components are formulated into an adhesive by dissolving the polyurethane and the catalyst into a mixture of the acrylic monomer component and the acid monomer component. In the solution thus formed, the polyurethane resin component will comprise about 10 to 70, preferably about 20 to 50 weight percent; the catalyst will comprise about 0.1 to 5.0, preferably about 0.5 to 2.0 weight percent, and the balance will be the acrylic monomer-acid monomer blend. These two monomer components should be proportioned in such fashion that the acid monomer comprises at least about 5.0 weight percent of the total formulation, preferably at least about 10.0 weight percent. Since the acid monomer will generally be relatively expensive, it is ordinarily not preferred to use more than about 20.0 weight percent, but there is no reason greater amounts cannot be employed, up to as much as about 67 percent of the adhesive, or even more if desired.

The basic adhesive composition thus formulated is storage stable for considerable periods of time, but where prolonged shelf life is desired, it is preferred to add to the basic formulation a minor amount, usually on the order of about 0.1 to 1.0 of the polymerization inhibitor such as hydroquinone, a hindered phenol, acetylacetonate, or the like. In such fashion stable lives of up to as long as a year can be attained.

By variations of the proportions of the components within the above limits, the physical character of the basic adhesive in the uncured state can be varied considerably, from a flowable liquid to a thick, highly viscous mass which is not readily susceptible to flow. Further control of such properties, as well as characteristics after cure may be attained by ancillary, or secondary additives, such as fillers, dyes, pigments, plasticizers, extenders, autioxidants, ultraviolet light stabilizers, and the like. Such materials will generally be limited in proportion to less than 100 weight percent, based on the weight of the basic adhesive composition.

THE INITIATOR COMPOSITION

Since the adhesive is stable and non-curing in the absence of an activator or initiator for the catalyst, a separate formulation of an appropriate initiator is necessary for the use of the adhesive. Desirably, the activator component will be a tertiary amine, such as N,N-dimethyl aniline, N,N-diethyl aniline, N,N-dimethyl-p-toluidine, and the like. The activator may be supplemented by accelerators which function to increase the reaction rate of the adhesive cure. Such accelerators are most conveniently a source of a heavy metal, such as copper, iron, cobalt, manganese, lead, and the like, most desirably as an organo-metallic compound or salt wherein the heavy metal is oxidizable, i.e., not in its highest oxidation state.

The activator and (optional) accelerator selected from use is encapsulated in a microsphere which is then dispersed in the adhesive solution. In the absence of other ingredients, the density of microspheres containing the amine activator (beads) is less than the adhesive due to the fact that the amine is significantly lighter. For example, the density of dimethyl-p-toluidine is 0.9366g/cc while, in a typical formulation, the adhesive is about 1.18g/cc. To avoid having the beads float on the surface of the adhesive, a denser material is incorporated. This may be a pigment such as titanium dioxide or a dense solvent such as a perhalogenated hydrocarbon. If heavy metal salt accelerators are employed, these can serve as the densifiers. In any event, sufficient densifying material is incorporated to result in a bead density equal to that of the adhesive solution, so that the beads will stay suspended therein. For example, tetrachloroethylene with a density of 1.624 may be combined with the dimethyl-p-toluidine in a ratio of 35/65 to yield a solution having the density of 1.18.

The amount of beads present in the adhesive composition may vary within wide limits. Generally, when the amount of activator exceeds about 20% by weight of the adhesive solution, little, if any, increase in bonding speed is noted.

The concentration of activator which has been found satisfactory ranges from about 1 to 20 wt% with from about 4 to 7 wt% being preferred.

The bead concentration in the adhesive composition will depend on the percentage of the tertiaryamine in the microsphere and the weight percent of activator in the adhesive composition. Thus, with an encapsulated tertiary amine having 90% amine, a useful range has been found to be 4.5 to 7.5 wt%. With a 67% tert. amine concentration 6–10 wt% is satisfactory.

Generally a bead concentration of a broad range of 1.1 to 30.0 wt percent may be used with a preferred range of about 4.4 to 11.2 wt percent.

THE MICROSPHERES

Since the microspheres are to be suspended in the adhesive solution in order to have a long shelf life and a long pot life, it is essential that they be substantially insoluble in the adhesive solution. The current state of the microencapsulation art is well developed and a large number of polymeric materials have been employed as the microsphere wall structures.

An overview of microencapsulation including a listing of typical wall material for microspheres and the various methods devised for producing the microspheres are found in the article entitled, "Microencapsulation" in the Kirk-Othmer *Encyclopedia of Chemical Technology*, Second Edition, 1967, pp. 436–455, Wiley and Sons publishers, New York, New York. This article is hereby incorporation by reference.

It is difficult to predict with certainty whether a particular microsphere wall composition will be soluble or insoluble in a particular adhesive composition and, if soluble, to what extent. Hence, for any given adhesive composition, the proposed microsphere must be tested to determine its solubility therein. We have found that a microsphere having a wall composition consisting of a formaldehyde cross-linked gelatin and encapsulating an activator amine is sufficiently insoluble in adhesive compositions containing methacrylic acid as the sole polymerizable acid monomer to result in an one-liquid adhesive having a shelf life and pot life of more than 60 days.

The same adhesive solution having solely acrylic acid as the acid component in an amount of about 30%, with the same microsphere, has a shelf life of, at most, about 2½ hours. However, by reducing the amount of acrylic acid in the adhesive solution to less than 10%, a longer pot life of useful duration can be obtained. The acrylic acid may be the sole acid monomer, or it may be used in conjunction with methacrylic acid; but in either case, the maximum content in the composition should not be greater than 10%.

Bead sizes which have been employed range from 10 to 1200 microns in diameter. In general the smaller diameter beads use more desireable, since less problems are presented thereby in obtaining thin adhesive layers. However preparation of beads at the lower end of the size range presents problems in purification and as a result are more expensive. We have found that beads in the 200 to 600 micron diameter range are the most practical because of their ease of preparation, and because by suitable methods thin adhesive layers readily may be made from compositions containing beads of this size range. However, larger bead sizes may also be employed and with proper precautions excellent adhesion may likewise be obtained.

The time required for adhesive bonds, in accordance with the present invention to set can be varied by appropriate selection of the film thickness, the adhesive dispersion, the catalyst, catalyst activator, accelerator and proportions thereof. Ordinarily, setting times of 15 to 900 seconds would be desireable with 120 to 400 seconds as the preferred range. The film thickness of adhesive as applied may vary from 0.5 mils to 40 mils with 4 mils to 7 mils being preferred for beads in the 200–600 micron range.

In applying thin film thickness of adhesive where beads of 200 to 600 microns are employed in the composition, the beads must be broken before applying the adhesive to the surface. Otherwise, the beads could be removed from the adhesive composition by the means employed to spread the film to a desired thickness. To illustrate this technique, in applying a ½-mil thick film of the one liquid adhesive, a set of nip rolls was used set at a 6 mil opening. The adhesive was squeezed through the nips, rupturing the capsules. The thickness was metered by drawing a metal sheet under the nip roll at a speed necessary to produce a half-mil layer of adhesive.

Another method which may be employed is to pass the adhesive through a gear pump where the beads are ruptured by the action of the gears. A third technique employed was to apply a metered 24 mil layer (or 600 microns) so that all the beads are on the substrate, apply pressure to rupture the beads, and then attenuate the layer to the desire film thickness. Excess adhesive is avoided by applying the adhesive in a thin strip, and controlling the thickness by shim stock.

This layers, larger than the particle size of the beads, are made by pre-crushing the beads using rolls, gear pumps or other means, and spreading over the substrate to the desired thickness by flowing trowelling or other means. Alternatively the adhesive composition may be spread on a surface, the other surface brought in contact to crush the beads, and then the surfaces spread apart to the desired thickness. In particular applications the method of pre-breaking the microspheres is highly useful since it allows greater viariation in, and control of, the thickness of the adhesive layer.

High bond shear strengths and peel strengths are obtained using the one-liquid adhesive dispersion of this invention for a wide variety of substrates; such as steel, aluminum wood, glass, polyvinyl chloride, nylon, polystyrene, glass-reinforced polyester, polyester films; such as, Mylar, surface activated polyolefines and poly (tetrafluoroethylene); such as, Teflon, ABS, natural rubber, SBR rubber, neoprene, hot galvanized steel and electrogalvanized steel.

EXAMPLES

The following specific examples illustrate the present invention. All parts recited therein are by weight.

EXAMPLE 1

Thirty-three parts of a polyester-based polyurethane resin, Estane 5712, a commercially available product of B. F. Goodrich Co., Inc., containing no free isocyanate groups was dissolved in a mixture of thirty three parts of methacrylic acid and thirty-four parts of methyl methacrylate. After the resin dissolved, five parts of benzoyl peroxide and 0.1 part hydroquinone were stirred into the mix until dissolved. Thereafter, 5 parts of formaldehyde cross-linked gelatin microspheres encapsulating dimethyl-p-toluidine dissolved in tetrachlorethylene as the activator were added and the mixture stirred. The microsphere beads had essentially the same specific gravity as the adhesive solution so they remained in suspension therein.

The adhesive dispersion was coated on a steel plate to form a layer 7 mils thick and covered by a second steel plate. Pressure was then applied to crush the microspheres. The set time (i.e., the time when it was no longer possible to move the plates relative to one another by hand) was found to be 3.5 minutes, and the shear strength of the bond was 950–1000 psi.

EXAMPLE 2

The one-liquid adhesive dispersion of Example 1 was allowed to stand for 21 days. At the end of this time, it had not gelled and was still pourable. The dispersion was poured on a steel plate, covered by a second steel plate and the microspheres in the dispersion were crushed by applying finger pressure to the plates. The set time was 3.5 minutes and the average shear strength was 950 psi.

EXAMPLE 3

An adhesive dispersion was made similarly to Example 1 having 10 parts of the polyurethane, 63 parts of methyl methacrylate, 27 parts of methacrylic acid, 5 parts of benzoyl peroxide, 0.1 parts of hydroquinone and 2 parts of the encapsulated microspheres. Adhesion of steel plates was tested with this mixture as in Example 1. The set time was 3.5 minutes and the average shear strength of the bond was 725 psi.

EXAMPLE 4

The adhesive dispersion of Example 3 was stored for 30 days. At the end of this time, the viscosity was not significantly different from this original sample and was low enough to pour. Adhesion of steel plates was tested as in Example 1, and the set time was found to be 4 minutes and the average bond shear strength was 720–725 psi. Similar results were obtained with the adhesive dispersion of this example after 60 days storage.

What is claimed is:

1. A one-liquid, activatable, curable adhesive dispersion comprising;

a solution of about 10 to about 70 weight percent a non-reactive thermoplastic polyurethane polymer resin dissolved in about 5 to about 67 weight percent of a free radical addition polymerizable acrylic monomer not containing an acid group;

and from about 5.0 to about 67 weight percent of a free radical addition polymerizable acid monomer co-polymerizable with said acrylic monomer selected from the group consisting of acrylic acid, methacrylic acid, the hydroxyethyl acrylate half esters of maleic, itaconic, fumaric, oxalic, terephthalic, and mixtures thereof;

said solution containing about 0.1 to about 5.0 weight percent of a non-activated free radical addition polymerization catalyst having a half-life of at least about ½ hour at 85° C;

said solution having dispersed therein pressure-rupturable microspheres having a wall composition substantially insoluble in said solution for a relatively long time period;

said microspheres having encapsulated therein about 1.0 to about 20 weight percent of a free radical addition polymerization catalyst activator, the density of the microspheres and encapsulated activator being substantially equal to the adhesive solution of polymer and monomers.

2. The adhesive dispersion of claim 1 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

3. The adhesive dispersion of claim 2 wherein the polymerization catalyst is benzoyl peroxide.

4. The adhesive dispersion of claim 3 wherein the catalyst activator is a member selected from the group consisting of dimethyl aniline, diethyl aniline and dimethyl-p-toluidine.

5. The method of adhesively fastening a pair of mating surfaces comprising joining the surfaces together by the one-liquid activatable curable adhesive dispersion of claim 1 by the steps in any order of coating a surface with said adhesive dispersion and rupturing the microspheres; and thereafter maintaining the surfaces in a contact relationship until said adhesive cures to a set.

6. The method of claim 5, comprising applying the adhesive dispersion of claim 1 to at least one of said mating surfaces and joining said surfaces together in a contact relationship with a force sufficient to rupture the microspheres in said adhesive dispersion.

7. The method of claim 5 comprising rupturing the microspheres in the adhesive dispersion of claim 1, thereafter applying said dispersion to at least one of said mating surfaces and joining the surfaces together in a contact relationship.

8. The method of claim 6 wherein the adhesive dispersion is that of claim 3.

9. The method of claim 6 wherein the adhesive dispersion is that of claim 4.

10. The method of claim 6 wherein the adhesive dispersion is that of claim 2.

11. The method of claim 7 wherein the adhesive dispersion is that of claim 2.

12. The method of claim 7 wherein the adhesive dispersion is that of claim 3.

13. The method of claim 7 wherein the adhesive dispersion is that of claim 4.

14. A one-liquid, activatable, curable adhesive dispersion comprising:

a solution of about 10 to about 70 weight percent a non-reactive thermoplastic polyurethane polymer resin dissolved in about 5 to about 67 weight percent of a free radical addition polymerizable acrylic monomer not containing an acid group;

and from about 5.0 to about 67 weight percent of a free radical addition polymerizable acid monomer co-polymerizable with said acrylic monomer, selected from the group consisting of acrylic acid, methacrylic acid, the hydroxyethyl acrylate half esters of maleic, itaconic, fumaric, oxalic, terephthalic, and mixtures thereof, wherein the acrylic acid does not exceed about 10 weight percent of the adhesive dispersion;

said solution containing about 0.1 to about 5.0 weight percent of a non-activated free radical addition polymerization catalyst having a half-life of at least about ½ hour at 85° C;

said solution having dispersed therein pressure-rupturable microspheres having a wall composition substantially insoluble in said solution for a relatively long time period comprising a formaldehyde cross-linked gelatin;

said microspheres having encapsulated therein about 1.0 to about 20 weight percent of a free radical addition polymerization catalyst activator.

15. The adhesive dispersion of claim 14 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

16. The adhesive dispersion of claim 15 wherein the polymerization catalyst is benzoyl peroxide.

17. The adhesive dispersion of claim 16 wherein the catalyst activator is a member selected from the group consisting of dimethyl aniline, diethyl aniline and dimethyl-p-toluidine.

18. The adhesive composition of claim 15 wherein the density of the microspheres and the encapsulated activator is substantially equal to the adhesive solution of polymer and monomers.

19. The adhesive composition of claim 15 wherein the range of polyurethane polymer resin is about 20 to about 50 weight percent, the acrylic monomer is about 20 to about 40 weight percent methyl methacrylate, the free radical addition polymerizable acid monomer consists of about 5.0 to about 35 weight percent of a member selected from the class consisting of methacrylic acid, acrylic acid and mixtures thereof and wherein the amount of acrylic acid does not exceed about 10 weight percent of the adhesive dispersion.

20. The adhesive composition of claim 19 wherein the density of the microspheres and the encapsulated activator is substantially equal to the adhesive solution of polymer and monomers.

21. The adhesive dispersion of claim 17 comprising about 10 parts by weight of polyurethane resin, about 63 parts by weight of methyl methacrylate, about 27 parts by weight of methyacrylic acid, about 5 parts by weight of benzoyl peroxide catalyst, about 0.1 part by weight of hydroquinone; and about 2 parts by weight of the catalyst activator, encapsulated in the pressure rupturable microsphere.

22. The adhesive composition of claim 21 wherein the density of the microspheres and the encapsulated activator is substantially equal to the adhesive solution of polymer and monomers.

23. The adhesive dispersion of claim 17 comprising about 33 parts by weight of polyurethane resin, about 33 parts by weight of methacrylic acid, about 34 parts by weight of methyl methylacrylate, about 5 parts by weight of benzoyl peroxide catalyst, about 0.1 part by weight of hydroquinone; and about 5 parts by weight of the catalyst activator, encapsulated in the pressure rupturable microsphere.

24. The adhesive composition of claim 23 wherein the density of the microspheres and the encapsulated activator is substantially equal to the adhesive solution of polymer and monomers.

25. The method of adhesively fastening a pair of mating surfaces comprising joining the surfaces together by the one-liquid activatable curable adhesive dispersion of claim 14 by the steps in any order of coating a surface with said adhesive dispersion and rupturing the microspheres; and thereafter maintaining the surfaces in a contact relationship until said adhesive cures to a set.

26. The method of claim 25, comprising applying the adhesive dispersion of claim 14 to at least one of said mating surfaces and joining said surfaces together in a contact relationship with a force sufficient to rupture the microspheres in said adhesive dispersion.

27. The method of claim 25 comprising rupturing the microspheres in the adhesive dispersion of claim 14, thereafter applying said dispersion to at least one of said mating surfaces and joining the surfaces together in a contact relationship.

28. The method of claim 26 wherein the adhesive dispersion is that of claim 17.

29. The method of claim 26 wherein the adhesive dispersion is that of claim 20.

30. The method of claim 26 wherein the adhesive dispersion is that of claim 21.

31. The method of claim 26 wherein the adhesive dispersion is that of claim 23.

32. The method of claim 27 wherein the adhesive dispersion is that of claim 17.

33. The method of claim 27 wherein the adhesive dispersion is that of claim 20.

34. The method of claim 27 wherein the adhesive dispersion is that of claim 21.

35. The method of claim 27 wherein the adhesive dispersion is that of claim 23.

36. The method of claim 27 wherein the adhesive dispersion is that of claim 24.

* * * * *